United States Patent [19]

Prince

[11] 4,425,091

[45] * Jan. 10, 1984

[54] MOLDING MACHINE

[75] Inventor: Edgar D. Prince, Holland, Mich.

[73] Assignee: Prince Corporation, Holland, Mich.

[*] Notice: The portion of the term of this patent subsequent to Mar. 24, 1999 has been disclaimed.

[21] Appl. No.: 328,116

[22] Filed: Dec. 7, 1981

Related U.S. Application Data

[62] Division of Ser. No. 199,066, Oct. 20, 1980, Pat. No. 4,345,893.

[51] Int. Cl.³ ............................................. B29F 1/06
[52] U.S. Cl. .............................. 425/589; 425/450.1; 425/451; 425/595
[58] Field of Search ............... 425/589, 590, 591, 592, 425/593, 594, 595, 450.1, 451, 451.2

[56] References Cited

U.S. PATENT DOCUMENTS

| | | | |
|---|---|---|---|
| 847,221 | 3/1907 | Alexander et al. | 425/188 |
| 1,333,617 | 3/1920 | Harkins | 251/304 |
| 1,466,309 | 8/1923 | Lowry | 164/121 |
| 2,498,264 | 2/1950 | Goldhard | 425/593 X |
| 2,586,896 | 2/1952 | Wittlin | 22/92 |
| 2,730,760 | 1/1956 | Bibby | 18/12 |
| 2,744,304 | 5/1956 | Kaul | 425/593 X |
| 2,797,455 | 7/1957 | Schrecongost | 22/92 |
| 2,888,731 | 6/1959 | McElroy et al. | 25/45 |
| 2,925,635 | 2/1960 | Bauer | 22/68 |
| 3,141,192 | 7/1964 | Benedetto | 425/451 |
| 3,337,909 | 8/1967 | Loges et al. | 425/451 X |
| 3,346,924 | 10/1967 | Lombard | 425/595 X |
| 3,359,598 | 12/1967 | Bucy | 425/153 |
| 3,388,431 | 6/1968 | Aoki | 425/190 X |
| 3,452,397 | 7/1969 | Newton | 425/153 |
| 3,534,442 | 10/1970 | Makle | 425/593 X |
| 3,540,524 | 11/1970 | Bachelier | 425/595 X |
| 3,547,184 | 12/1970 | Kock | 164/343 |
| 3,590,436 | 7/1971 | Akesson | 425/595 X |
| 3,599,289 | 8/1971 | Girola | 425/451.2 X |
| 3,664,411 | 5/1972 | Carver et al. | 164/312 |
| 3,669,595 | 6/1972 | Zippel et al. | 425/188 |
| 3,669,599 | 6/1972 | Snider et al. | 425/451.2 X |
| 3,687,590 | 8/1972 | Cyriox | 425/450.1 X |
| 3,734,673 | 5/1973 | Paterson et al. | 425/451.2 |
| 3,756,669 | 9/1973 | Bucelluni | 308/3.9 |
| 3,782,874 | 1/1974 | Hehl | 425/190 |
| 3,948,311 | 4/1976 | Sylvester | 164/341 |
| 3,951,579 | 4/1976 | Myers et al. | 425/590 X |
| 3,981,671 | 9/1976 | Edwards | 425/453 |
| 4,025,268 | 5/1977 | Taylor | 425/589 X |
| 4,029,457 | 6/1977 | Yamamoto | 425/451 X |
| 4,032,277 | 6/1977 | Linde et al. | 425/451.2 X |
| 4,090,837 | 5/1978 | Belevski et al. | 425/589 X |
| 4,158,910 | 6/1979 | Hanas et al. | 425/451.2 X |
| 4,172,872 | 10/1979 | Magai | 425/589 X |
| 4,285,384 | 8/1981 | Wander | 425/589 X |
| 4,309,164 | 1/1982 | Egger et al. | 425/589 |

FOREIGN PATENT DOCUMENTS

| | | |
|---|---|---|
| 478615 | 11/1951 | Canada . |
| 860246 | 10/1952 | Fed. Rep. of Germany . |
| 1339379 | 8/1963 | France . |
| 158058 | 3/1962 | U.S.S.R. . |

*Primary Examiner*—Thomas P. Pavelko
*Attorney, Agent, or Firm*—Price, Heneveld, Huizenga & Cooper

[57] ABSTRACT

A molding machine for die casting, injection molding, and other similar processes, comprises a base shaped to support thereon a two-part die, and a ram for converging and diverging the die halves between open and closed positions. A pair of clamping frames are pivotally mounted on one end of the base, and include a closed border shaped to surround or receive therein side portions of the die halves. The clamping frames are laterally pivoted between a fanned-apart or open position wherein the die can be freely lifted off of the base, and a folded or closed position wherein the frame borders surround the die side portions and capture the same between the ends of the frames. In the closed position, retractable compression columns extend between the die and one end of the frames to positively lock the die halves in the closed position, whereby die separation forces developed during injection of the die are resisted substantially solely by the clamping frames.

16 Claims, 18 Drawing Figures

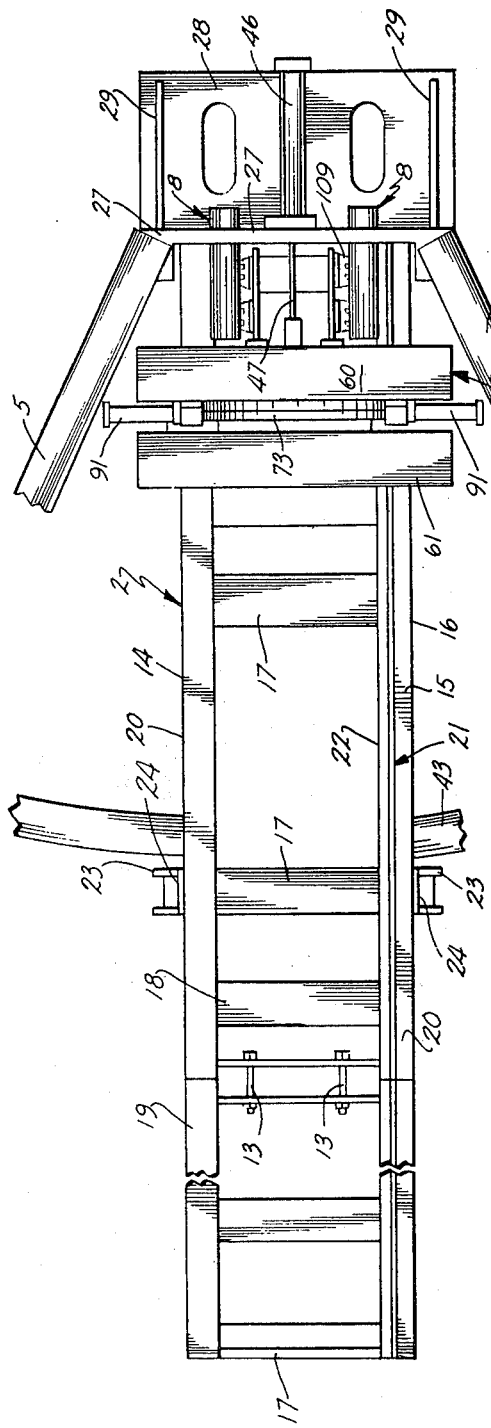
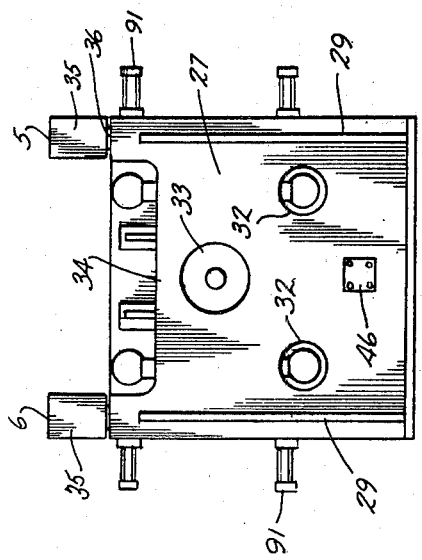

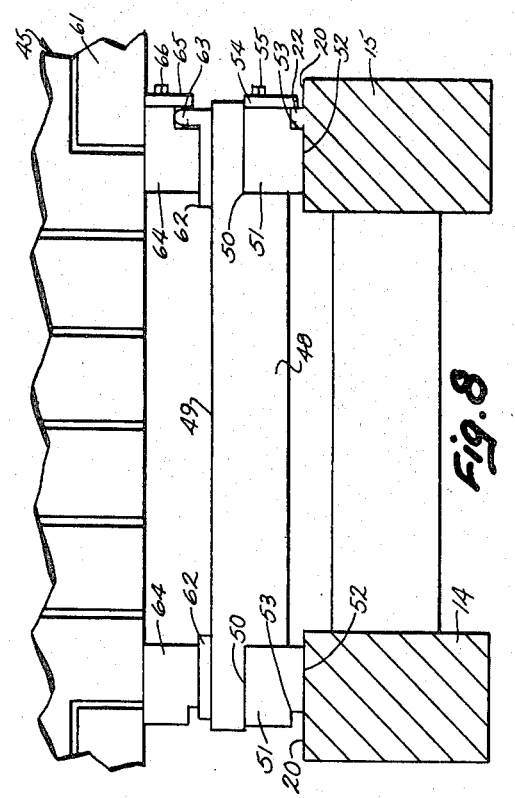

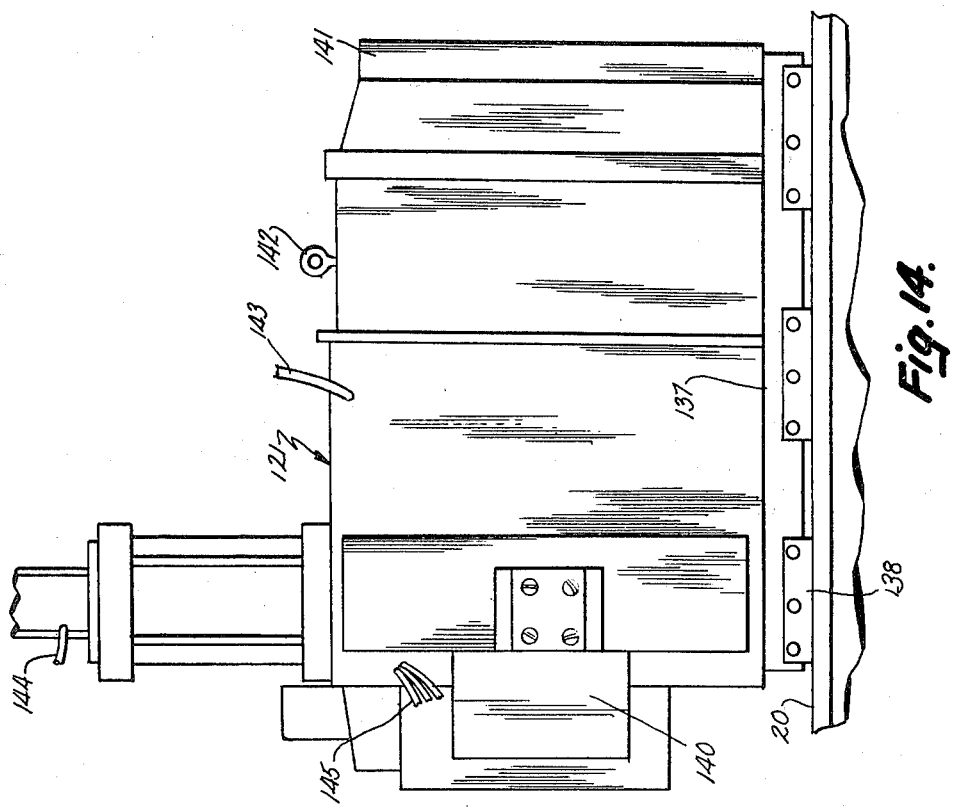
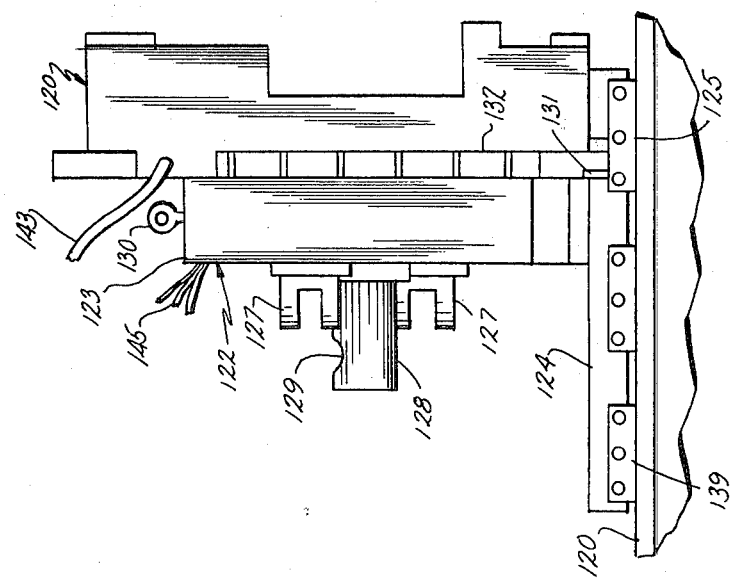

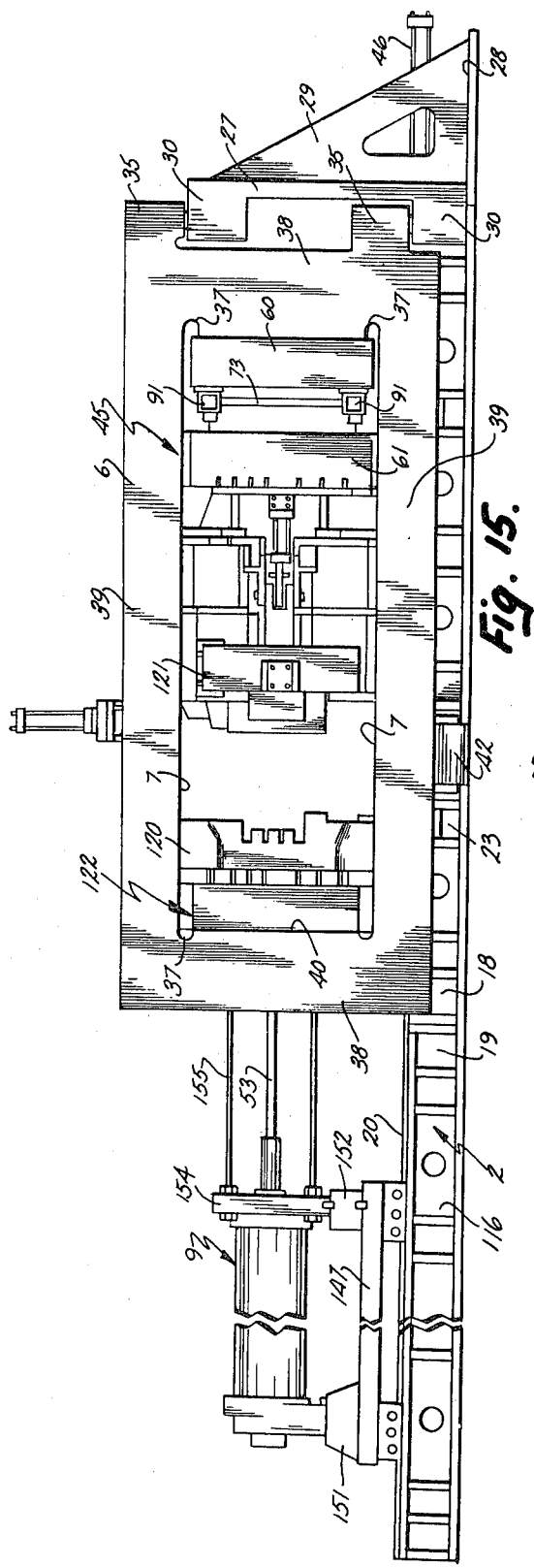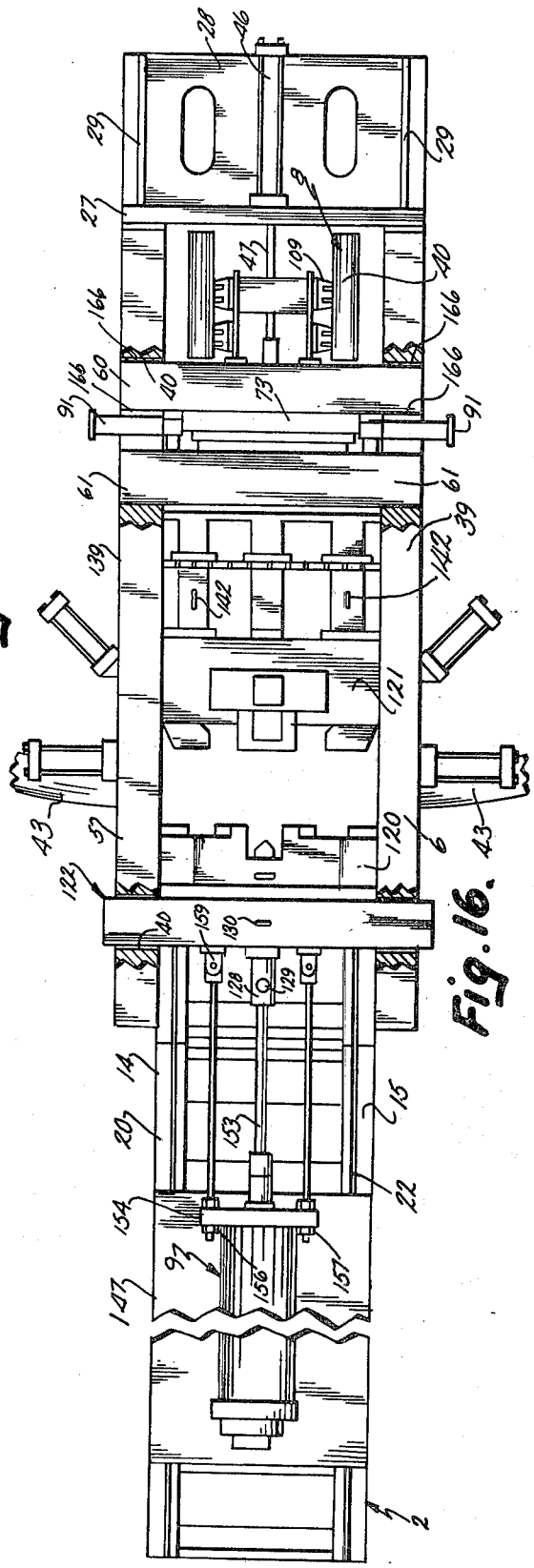

MOLDING MACHINE

This is a division of application Ser. No. 199,066, filed Oct. 20, 1980, U.S. Pat. No. 4,345,893.

BACKGROUND OF THE INVENTION

The present invention relates to molding machines, and in particular to molding machines of the type having movable die halves with means for injecting a liquid or soft molding material therein, such as those used in die casting, injection molding, and the like.

Molding machines are used to form a wide variety of articles from different types of materials, such as metal, plastics, and the like. Although the present invention is particularly adapted for forming metal parts by die casting, it is to be understood that other molding machines and processes encounter problems similar to those experienced in die casting. Hence, the novel features and arrangements of parts disclosed and claimed herein are to be considered equally applicable to such alternative molding devices.

One problem associated with molding machines in general, and in particular with die casting machines, relates to the degree of difficulty and amount of time which is required to remove and replace dies from the machine. Large die casting machines for deep castings, such as those used to form engine blocks and other large parts, typically require a great deal of time and effort to remove and replace the dies, and further require the services of highly skilled workers from a wide variety of trades, including millwrights, electricians, and plumbers. Heretofore, the utility services for the dies, such as plumbing for hydraulics and cooling water, wiring for electrical controls, and the like, have been hooked up after the die is positioned in the molding machine. These utility connections alone result in substantial down time for the machine. Not only is machine down time extremely costly from the standpoint of overhead, but die changeover must usually be performed on a premium time basis, thereby causing high labor costs. Since die removal and replacement must be accomplished in accordance with a set sequence or procedure, the various skilled trades must be scheduled to work on the die in overlapping shifts, and/or simultaneous jobs, thereby creating an inherently inefficient operation. Another problem experienced with die casting machines stems from the manner in which the die halves are mounted on the platens. Typically, the die halves are suspended adjacent to the platens, and then fastened thereto so that the die halves project from the platens in a cantilevered fashion. This arrangement makes it quite difficult to achieve proper initial alignment of the die halves. Also, as the die halves are heated up and cooled during operation, thermal expansion and contraction causes the die halves to move out of alignment, such that frequent adjustment is often necessary. In a similar manner, the various parts of the molding machines, such as the platens and the toggles, are typically positively connected with a common base member during operation, such that uneven thermal expansion, and the intermittent forces of die injection tend to loosen these connections and shift the molding machine members out of alignment.

Yet another problem experienced with die casting is the secure sealing of the die halves together in the closed position. If the die halves are not properly sealed, molten metal will "spit" from the die, thereby creating a substantial safety hazard, and often injuriously effecting the formation of the molded article. This problem is particularly apparent in large die casting machines, which have dies with large surface areas and/or complex shapes, thereby requiring very high injection pressures.

Still another problem associated with large die casting machines, such as those noted hereinabove, is that the same are extremely heavy and massive, thereby creating serious shipping problems. Heretofore, even special shipping procedures have required that the machines be disassembled to a considerable extent, such that extensive reassembling, setup, and readjustment is required before the machine can be placed in initial operation.

SUMMARY OF THE INVENTION

The principal objects of the present invention are: to provide a molding machine having movable clamping frames for quickly and easily removing and replacing dies therefrom; to provide a molding machine wherein service utilities for the dies, such as plumbing, wiring, and the like, are attached thereto in a modular fashion prior to placement of the die in the molding machine for reduced machine down time; to provide a molding machine having means for positively locking the die halves together in a closed position to prevent spitting, even under high injection pressures; to provide a molding machine which is particularly adapted for die casting; to provide a molding machine having a die mounting arrangement which reduces time consuming alignment procedures; to provide a molding machine having a die mounting arrangement which retains the die halves in accurate alignment during operation without requiring repeated readjustment; to provide a molding machine wherein the die halves are slideably mounted on a base for reduced set up time and adjustment; to provide a molding machine having a modular construction which can be readily disassembled for shipment and reassembled without extensive adjustment; to provide a molding machine having a self-aligning compression piston for secure closing of the die halves; and to provide a molding machine which is relatively economical to manufacture, efficient in use, capable of a long operating life, and particularly well adapted for the proposed use.

These and other important features, advantages, and objects of the invention will be further understood and appreciated by those skilled in the art by reference to the following written specification, claims, and appended drawings.

BRIEF DESCRIPTION OF THE DRAWINGS

FIG. 5 is a fragmentary top plan view of the molding machine, with the die removed.

FIG. 6 is an end elevational view of the molding machine, taken from the right end thereof as viewed in FIG. 2.

FIG. 7 is an enlarged, fragmentary side elevational view of a movable carriage portion of the machine.

FIG. 8 is a fragmentary vertical cross-sectional view of the movable carriage, taken along the section line VIII—VIII, FIG. 7.

FIG. 9 is an enlarged vertical cross-sectional view of the molding machine, taken along the section line IX—IX, FIG. 3.

FIG. 10 is an enlarged fragmentary, side elevational view of the movable carriage.

FIG. 13 is a side elevational view of one of the die halves mounted on the molding machine.

FIG. 14 is a side elevational view of the other die half mounted on the molding machine.

FIG. 15 is a side elevational view of the molding machine, with the die in a fully opened position.

FIG. 16 is a top plan view of the molding machine, with the die in the fully opened position as illustrated also in FIG. 15.

DETAILED DESCRIPTION OF THE PREFERRED EMBODIMENTS

Figure 1:
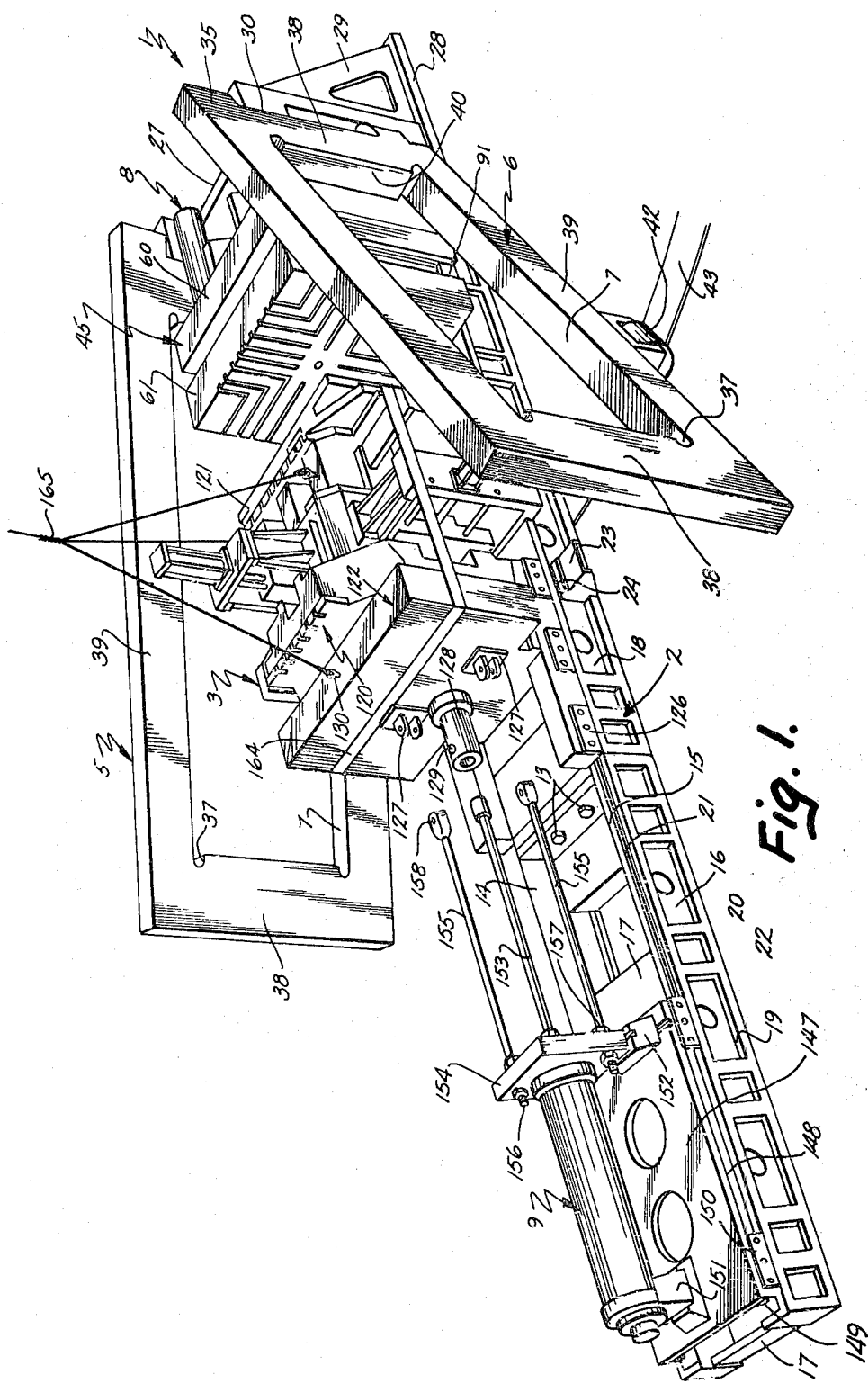
FIG. 1 is a perspective view of a molding machine embodying the present invention, shown with clamping frames in a fanned-apart, open position, and a die ready for lifting off of the machine by an overhead crane.

For purposes of description herein, the terms "upper", "lower", "right", "left", "rear", "front", "vertical", "horizontal", and derivatives thereof shall relate to the invention as oriented in FIG. 1. However, it is to be understood that the invention may assume various alternative orientations, except where expressly specified to the contrary.

The reference numeral 1 (FIG. 1) generally designates a molding machine which is particularly adapted for die casting, and comprises a base 2 shaped to removably support a two-part die 3 thereon, and means for converging and diverging the die halves between open and closed positions. A pair of clamping frames 5 and 6 are pivotally mounted on one vertically extending end of base 2, and include a closed border 7 which is shaped to surround and receive therein side portions 166 of the halves of die 3. The clamping frames 5 and 6 are laterally pivoted between an open or fanned-apart position (FIG. 1), wherein die 3 can be freely lifted off of base 2, and a closed or folded position (FIGS. 2 and 3) wherein the frame borders 7 surround the sides 166 of die 3 and capture the same between the ends of the clamping frames. In the folded position, retractable compression columns 8 (FIG. 2) extend between the rear surface of the die and the rear end of frames 5 and 6 within border 7 to positively lock the die halves in the closed position, whereby die separation forces developed during injection of the die by a shot cylinder 9 are resisted substantially solely by the clamping frames 5 and 6. A compression cylinder 73 urges the die halves tightly together before injection of the mold, and may be energized during the injection step to assist in securely retaining the die in the closed position.

As best illustrated in FIGS. 1 and 5, base 2 comprises a pair of rails 14 and 15 which are disposed in a longitudinally extending, mutually parallel, and spaced apart fashion. Rails 14 and 15 each are secured to side plates 16 (FIG. 1) which support the rails at a predetermined distance above the floor surface. Laterally extending braces 17 securely interconnect opposed side plates 16 and rails 14 and 15 at spaced locations along their length and retain the latter in parallel relationship. The illustrated rails 14 and 15 include two separate, longitudinally divided portions 18 and 19, such that the machine can be disassambled and transported more easily. Suitable fasteners 13 interconnect rail sections 18 and 19 during use.

The die 3 is normally supported on the rear section 18 of the rails (as viewed in FIG. 1), and shot cylinder 9 is normally supported on the forward section 19 of the rails. The upper surface 20 of both rails 14 and 15 is accurately machined for slideably supporting die 3 and shot cylinder 9 thereon. An alignment track 21 (FIG. 5) extends vertically upwardly from and longitudinally along the upper surface 20 of at least one of the rails 14 and 15 to insure horizontal alignment between the die halves and other machine parts during the operation of the molding machine. The illustrated track 21 includes a rib 22 upstanding from the otherwise planar surface of the right hand rail 15 (as viewed in FIG. 1). Rib 22 extends along the entire length of the right hand rail, and is shaped to form a mating way and guide arrangement with the sliding portions of the molding machine as illustrated, for example, in FIG. 9.

The upper surface 20 of the left hand rail 14 is substantially planar, and is disposed at an elevation precisely aligned with the planar portion of the right hand rail 15. A pair of cantilevered supports or pads 23 are connected with the base and project from opposing sides thereof adjacent the free ends of clamping frames 5 and 6. Pads 23 have vertical stop portions 24, and abuttingly support the clamping frames in place when in the folded or closed position, as described in greater detail hereinafter.

A stationary end plate 27 (FIG. 13) is connected with the rearward end (toward the right as viewed in FIG. 1) of base 2, and is disposed in a substantially vertical orientation. End plate 27 is supported on a base plate 28, and a pair of gussets 29 interconnect the end and plates 27 and 28 on the opposite sides thereof. In this example, gussets 29 are triangular in shape. A pair of vertically spaced hinge blocks 30 (FIG. 2) are mounted on each side of end plate 27, and provide means for pivotally mounting clamping frames 6 and 5 on the molding machine. Each of the hinge blocks 30 includes a vertically disposed aperture 31 therethrough with the apertures of each pair of blocks being vertically aligned. As best illustrated in FIG. 6, end plate 27 includes a lower pair of apertures 32, an upper, central aperture 33, and a recessed upper edge 34 for purposes to be explained hereinafter.

Figure 2:
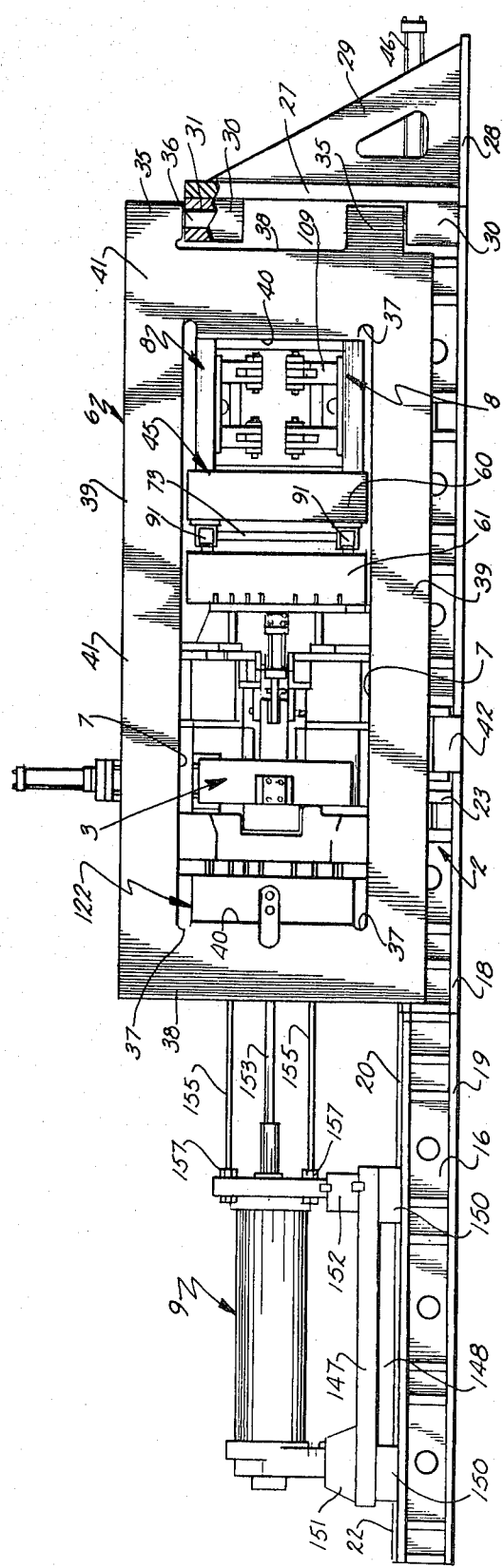
FIG. 2 is a side elevational view of the molding machine, shown with the clamping frames in a closed position and a portion thereof broken away.

The illustrated clamping frames 5 and 6 are pivotally mounted on base 2, however, it is to be understood that the present invention contemplates various means for movably mounting the frames in a manner which will permit the same to be separated from the base 2 and die 3. As best shown in FIG. 2, the clamping frames 5 and 6 include a pair of vertically spaced-apart hinge blocks 35 with pins 36 telescopically received in the apertures of hinge blocks 30 of end plate 27 for pivotally interconnecting the clamping frames therein in a manner which permits the frames to pivot laterally in a substantially horizontal plane. The exterior periphery of clamping frames 5 and 6 is otherwise rectangular, and the interior border 7 is also generally rectangular in shape with rounded corners 37 to reduce stress concentration. Each clamping frame includes a pair of parallel end segments 38 and a pair of parallel side segments or legs 39 which are integrally interconnected, whereby the die compression and separation forces impose substantially pure tensile loading in the parallel side segments 39 of the frames. The clamping frames also have flat, mutually parallel inner and outer side faces 41.

Although the illustrated clamping frames are rectangular in shape, other shapes, such as circular, semitoroidal and the like, which have a hollow interior defined by a closed border, and include opposite portions between which the slideable portions of the machine can be constrained are also contemplated by the present design. The clamping frames are preferably constructed of a one-piece construction, such as being formed from a single block of high strength metal, or are of a laminated construction, wherein a plurality of rectangular, frame-shaped plates are laterally interconnected. In any event, clamping frames 5 and 6 must be extremely strong, and capable of withstanding enormous forces applied in opposite directions to the frame end segments 38. The end segments 38 are slightly wider than the side segments 39, and the interior flat edges 40 of both end segments 38 are precisely machined surfaces which are substantially planar, mutually parallel, and adapted for abutment with other portions of the molding machine to clampingly retain the die halves in a closed position without causing misalignment in a vertical plane. In the closed position, clamping frames 5 and 6 are disposed adjacent to the sides of base rails 14 and 15, and assume a substantially parallel orientation. The lower outer ends of the clamping frames are abuttingly supported on pads 23 in a manner such that the horizontally extending side edges of border 7 are oriented substantially parallel with the upper surfaces 20 of rails 14 and 15. Rollers 42 may be mounted on the lower edges of clamping frames 5 and 6 at the outer ends thereof to support the frames during rotation on arcuate rails or tracks 43.

The molding machine 1 includes a movable carriage 45 (FIG. 1) which is slideably mounted on the rails of base 2 for longitudinal translation therealong. A ram 46 (FIG. 3), such as a screw motor or hydraulic cylinder, is attached to the exterior side of end plate 27 between rails 14 and 15, and includes a reciprocating piston rod 47 (FIG. 3) which has an outer end thereof attached to the inner end of carriage 45, and translates the carriage along the base. As best illustrated in FIGS. 7 and 8, carriage 45 includes a base plate 48 having a substantially flat upper surface 49, and L-shaped notches 50 along each side edge of the base plate. Each of the notches 50 includes a pair of support blocks 51 disposed therein and fixedly attached to base plate 48 at the forward and rearward ends thereof. The lower surface 52 of each of the support blocks 51 is carefully machined to provide a flat surface which mates with the planar portions of the upper surfaces 20 of rails 14 and 15 and supports the same along a substantially horizontal plane. The outer, lower corner of each of the support blocks 51 includes a longitudinal notch 53 therein, which on the right rail 14, mates with the upwardly projecting track or rib 22 and receives the same therein. A guide or cover plate 54 is attached to the outer surface of support block 51 on the right hand side of the carriage 45 to form a way in which rib 22 is captured and slides therealong. The lower surface 52 of the left hand support block 51 is smooth and capable of sliding laterally on the upper surface of left hand rail 14, such that when the molding machine heats up, uneven thermal expansion between the carriage and the rails will not cause the carriage to bind.

A platen 60 (FIGS. 7, 9 and 10) is fixedly mounted on and extends laterally across a medial portion of base plate 48. A movable platen 61 is slideably mounted on the upper surface 49 of base plate 48 by a track arrangement similar to that used to mount carriage 45 on base 2. Slide plates 62 (FIG. 8) are mounted along the upper edges of the base plate 48, and right slide plate 62 includes an upstanding rib 63 which is received in a mating support block 64. A cover plate 65 is attached to the exterior side of the right support block 64 by fasteners 66 to form a way in which the rib 63 is slideably and captively received. The left hand slide track 62 and support block 64 respectively have smooth mating surfaces which permit the movable platen 61 to expand laterally without binding. As best illustrated in FIG. 9, the fixed and movable platens 60 and 61 respectively, each have a substantially similar, rectangular shape with sides 67 which extend over the sides of the base plate 48. Fixed platen 60 is supported by a pedestal 67 (FIG. 7) such that both platens 60 and 61 are vertically aligned. The exterior or forward facing surface 68 of movable platen 61 is shaped to mate and connect with one half of die 3, as will be described in greater detail hereinafter.

Figure 11:
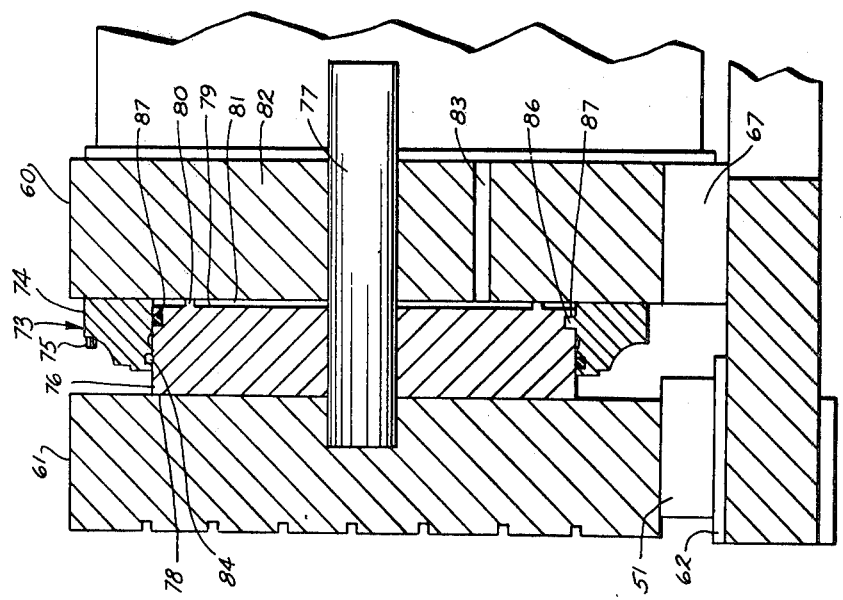
FIG. 11 is an enlarged, fragmentary vertical cross-sectional view of a compression cylinder portion of the molding machine, taken along the line XI—XI, FIG. 3.

As best illustrated in FIG. 11, means are connected between the platens 60 and 61 to converge and diverge the platens. Preferably a short stroke, high compression cylinder 73 is employed and is capable of extending movable platen 61 with a force in the nature of 3,000 tons. Cylinder 73 includes an outer housing 74 which is attached to the fixed platen 60 by bolts 75, and a piston 76 telescopically mounted therein on a rod 77. The forward face 78 of piston 76, as well as the forward end of rod 77 are fixedly connected with the movable platen 61. The rearward face 79 of piston 76 includes an outwardly protruding, annularly shaped ring 80 concentric with rod 70, and which forms a chamber 81 between the adjacent surfaces of fixed platen 60 and piston 76. The rearward end of rod 77 is slideably positioned in an aperture 82 through the center of fixed platen 60, and is aligned with end plate aperture 33 (FIG. 6) in which the same is received in the fully retracted position. A passageway 83 is provided through fixed platen 60 to couple chamber 81 with a source of pressurized fluid, such as air, hydraulic fluid, or the like. The inner circumference of housing 74 includes a groove 84 in which a seal or O-ring 85 is mounted for sealing engagement with the outer surface of piston 76. Piston 76 also includes an annularly shaped groove 86 about the outer circumference thereof, with a seal or O-ring 87 mounted therein to engage the inner surface of housing 74, thereby forming a double seal between piston 76 and housing 74. When pressurized fluid is applied through passage 83 to chamber 81, cylinder 73 is extended, thereby slideably translating movable platen 61 over slide plates 62 and diverging platens 60 and 61 to urge the die halves into a compressed position. Sufficient skirt tolerance is provided between the adjacent surfaces of piston 76 and housing 74, so that the piston can cock or become slightly angled in the housing to facilitate the even application of force to the die halves. The double O-rings 85 and 87 are capable of maintaining seal integrity even when the piston 76 is in a slightly cocked position. The forward movement of the carriage 45 as described below normally retracts cylinder 73. However, suitable return means, such as a spring (not shown) for connection with the rearward end of rod 77 may be provided to positively retract the cylinder to its normal position. Although a cylinder arrangement is shown and described herein, it is to be understood that the means for converging and diverging platens 60 and 61 may also include a sealed bellows arrangement (not shown), or the like.

Figure 12:
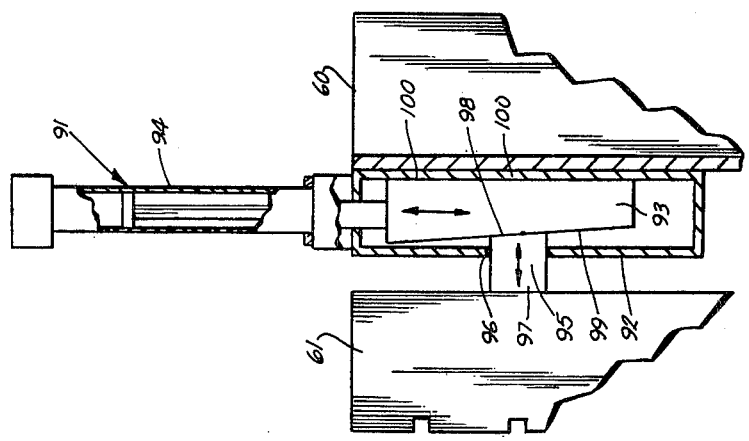
FIG. 12 is an enlarged, fragmentary cross-sectional view of a jack portion of the molding machine, taken along the line XII—XII, FIG. 3.

Locking jacks 91 (FIGS. 7, 10 and 12) are positioned between the platens 60 and 61 and are extended during a fully closed die position to positively lock the die halves together between the ends 40 of clamping frames 5 and 6. In the illustrated structure, a wedge driving cylinder or jack 91 is attached to each corner of fixed platen 60 to securely retain the movable platen in a set position. As best illustrated in FIG. 12, the jacks 91 comprise a housing 92 mounted on fixed platen 60, and a wedge-shaped member 93 reciprocated in the housing in the direction of the arrows by a suitable means such as the illustrated cylinder 94. A stud or peg 95 is telescopically received in an aperture 96 disposed in a side wall portion of housing 92, and is oriented in a substantially perpendicular relationship with wedge 93. The free end 97 of stud 95 is shaped for abutment with the adjacent surface of movable platen 61. The inner end 98 of stud 95 is inclined at an angle which mates with the inclined surface 99 of wedge 93, whereby extension of cylinder 94 extends stud 95 outwardly into engagement with the adjacent surface of platen 61. The rear face 100 of wedge 93 is disposed in sliding abutment with the rearward housing side wall 101 such that when stud 95 is in abutment with platen 61, the space between the platens 60 and 61 is positively blocked for purposes to be described in greater detail hereinafter. Suitable means, such as springs (not shown) are provided for automatically retracting studs 95 when wedge 93 is retracted.

The compression columns 8 (FIGS. 7, 9 and 10) are mounted on the movable carriage 45, and are adapted to be extended and retracted between the fixed platen 60 and the rearward end surface 40 of the clamping frames 5 and 6. In this example, four compression columns 8 are provided, and the same are mounted on a pair of parallel side plates 104 which are connected with and extend rearwardly from the back surface of fixed platen 60. Mounting plates 105 extend along the back surface of platen 60, as well as along the upper surface of base plate 48, and connect the side and bottom edges of the side plates 104 therewith. A cross brace 106 is connected between side plates 104 at an upper, rearward portion thereof to rigidly retain the plates in substantially parallel orientation. Two pairs of male hinge members 107 are mounted on the exterior side of each plate 104 at medial portions thereof. Each male hinge 107 includes three projecting fingers or plates, and the two hinges of each pair are horizontally aligned.

The compression columns 8 generally comprise rigid members which are positioned between the frame ends and the movable machine members on base 2, so that the die halves are positively blocked together between the frame ends during mold injection. In this example, columns 8 are substantially cylindrical in shape, and include a flattened side 108 to which a pair of arms 109 is connected. Each of the arms 109 has a forked end 110 which forms a female portion of the hinge and is received between the fingers of the male hinge 107 for pivotal interconnection by a pin 111. A cross brace 112 extends between each pair of arms 109 and securely interconnects the same. The compression columns 8 are substantially incompressible, and include forward ends 113 (FIG. 10) which slide abuttingly against the rearward surface of fixed platen 60. The compression column ends 113 may include a slide bearing (not shown) and/or a bifurcated portion (not shown) with springs between the adjacent column portions to prevent binding between the column ends 113 and fixed platen surface when the arms 109 are pivoted. The hinge assemblies 107 and 110 include sufficient tolerance in the longitudinal direction to allow the compression columns to shift into abutment with platen 60. The rearward ends 114 of compression columns 8 are positioned adjacent to the rearward end surface 40 of the associated clamping frame when the die is in a partially closed position. Column ends 114 are adapted for abutting engagement with the clamping frame end face 40.

As best illustrated in FIG. 9, each of the compression columns 8 includes motive means, such as a cylinder 115, with one end 116 thereof pivotally mounted on the exterior side of the side plates 104 at the upper and lower portions thereof, and the other end pivotally connected with the column arms 109. Extension of cylinder 115 pivots the associated arm 109 and column 8 outwardly into a position shown by the phantom lines in FIG. 9, wherein the ends 113 and 114 of the columns are disposed between platen 60 and the clamping frame ends 40 respectively. Retraction of one of the cylinders 115 pivots the associated compression column 8 to a fully retracted position, wherein the rearward end 114 of compression column 8 is in a fully nonaligned position with the clamping end 40, so as to permit relative translation therebetween. In this preferred embodiment, the column arms 109 assume a substantially vertical orientation in the retracted position, and are rotated an angle in the nature of 30° therefrom into the extended position.

The molding machine base 2 is adapted to support a wide variety of different types of two-piece dies thereon. Hence, the clamping frame concept disclosed and claimed herein contemplates any type of two-piece die which is clamped together to retain the same in a closed position during introduction of the liquid forming material. Preferably, the die 3 is slideably mounted on base 2 to facilitate the removal and replacement of the die from the machine. As best illustrated in FIGS. 1, 13 and 14, die 3 comprises a stationary die half 120 and a reciprocating die half 121. Stationary die half 120 is mounted on a sliding end platen assembly 122 which includes a rectangular platen 123 having a shape substantially similar to the fixed and movable platens 60 and 61. Platen 123 is supported on a pair of slide supports 124, which are located on opposite sides of platen 123, and oriented in a parallel fashion, spaced apart a distance substantially commensurate with the distance between base rails 14 and 15, such that slide supports 124 abut the rails. The supports 124 have a construction quite similar to that of support blocks 51 on movable carriage 45, and include spaced apart pads 125 for sliding engagement with the upper surfaces 20 of rails 14 and 15. Cover plates 126 (FIG. 1) are attached to the exterior side of the right hand support 124 to form a groove in which track rib 22 is slidingly received. A pair of clevis shaped brackets 127 are mounted on the exterior side of the end platen 123 adjacent the central portion thereof, and a shot sleeve or cold chamber 128 is positioned therebetween for purposes to be described in greater detail hereinafter. Shot sleeve 128 includes an upwardly disposed aperture or pour hole 129 adapted to receive molten metal therein. An eye-shaped fastener 130 is fixedly mounted in the upper surface of end platen 122 to facilitate lifting the die from the base of the machine.

With reference to FIG. 13, the slide supports 124 of the illustrated end platen assembly 122 include a transverse notch 131 in which a face plate portion 132 of the stationary die half 120 is received and abuttingly supported. The face plate 132 is securely connected with end platen 123 by suitable fasteners, such that stationary die half 120 slides with the end platen assembly 122 over the base rails 14 and 15. Preferably, each stationary die half 120 to be used on the molding machine is paired with a separate end platen assembly 122, and is connected therewith throughout the useful use of the die. In this manner, once the stationary die half 120 has been vertically and horizontally aligned on the rails 14 and 15, and with respect to the mating die half 121, alignment between the die halves need not be readjusted. The illustrated die half 120 is the cover portion of the die, and does not include any moving cores.

The movable die half 121 (FIG. 14) is also mounted on a pair of slide supports 137 with spaced apart pads 138 abuttingly supported on the upper surface of rails 14 and 15. The pads on the right hand support 137 include cover plates 139 attached to the exterior face thereof, so as to form a groove in which track rib 22 is slidingly received. The forward end of movable die half 121 includes a plurality of movable cores 140 which are extended and retracted to place the die in a closed and open position, so as to form a molded part, and then eject the same from the die. This aspect of the die is conventional, and therefore does not require additional explanation. The rearward end of the movable die half 121 includes a face plate 141 which is adapted for abutment and connection with the movable platen 61. A pair of eye-shaped fasteners 142 are fixedly mounted in the upper portion of the movable die half 122 in a spaced apart fashion to facilitate lifting the die off of the machine base 2. The sliding supports 137 are preferably affixed to the bottom of the movable die half 121, such that like the stationary die half 120, once the die half has been aligned vertically and horizontally with respect to the rails 14 and 15, and with respect to the mating stationary die half, the dies may be removed and replaced from the machine without requiring extensive realignment.

The die 3 is preferably preplumbed and prewired in a modular fashion to speed up connecting the die with the service utilities, such as water, hydraulics and electricity. It will be appreciated by those skilled in the art that dies such as those illustrated herein require water to cool the die halves, pressurized hydraulic fluid or air to operate the core cylinders 140, electricity to power instrumentation, rams, and the like, as well as other utilities to properly operate the machine. Instead of hardwiring the electrical lines and/or directly plumbing cooling water and hydraulics to the die after it has been mounted on the machine base, electrical pigtails and quick disconnect plumbing joints are installed on the die when it is initially set up. Utility lines 143-145 (FIGS. 13 and 14) schematically illustrate such connections for water, hydraulic fluid and electricity respectively. With this arrangement, the electrical lines can be quickly plugged in, and the water and hydraulic plumbing lines are swiftly connected to significantly reduce die set up time. The initial hookup of service utilities to the die, as well as subsequent changes, can be made by tool room personnel at a location remote from the molding machine, thereby greatly reducing machine down time and improving labor efficiency.

Figure 3:
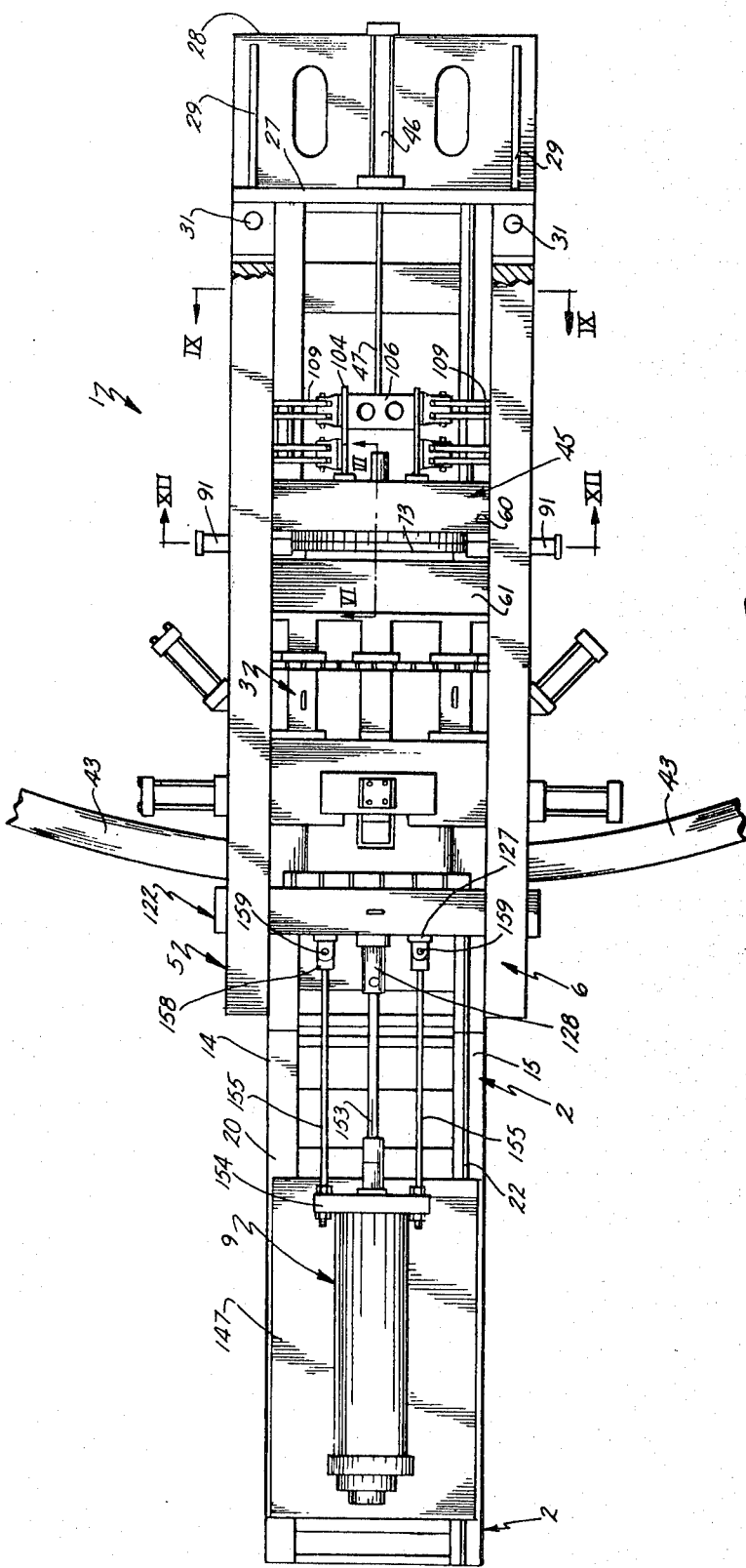
FIG. 3 is a top plan view of the molding machine, shown with the clamping frames in the closed position and portions thereof broken away.

As best illustrated in FIGS. 1 and 3, the shot cylinder 9 is mounted on a base plate 147, which is quite similar in construction to base plate 48 of movable carriage 45. Notches 148 extend along each side edge of base plate 147, and a pair of support blocks 149 are mounted in each of the notches 148 at both ends of the base plate. The right hand support blocks 149 include cover plates 150 connected with the exterior surface thereof, so as to form a notch in which track rib 22 is slidingly received. The left hand support block 149 has a smooth lower surface to permit lateral movement of the same over the left hand rail 14 to accommodate thermal expansion. The shot cylinder 9 is mounted on the base plate 47 by two pedestals 151 and 152 which position the cylinder plunger 153 at an elevation substantially coextensive with the aperture in shot sleeve 128. The end platen assembly 122 and shot cylinder 9 are laterally aligned during initial set up to insure that the plunger 153 is concentric with the shot sleeve aperture, and that the same is telescopically received therein during operation. A mounting plate 154 is connected with the forward end of shot cylinder 9 and fixed pedestal 152, and includes a pair of tie-rods 155 attached to plate 154 at opposite corners thereof. The rearward ends 156 of tie-rods 155 are received through apertures in plate 154, and are threaded with nuts 157 on each side of the plate, and can be used to adjust the length of the tie-rod with respect to mounting plate 154. The free ends of the tie-rods 155 include apertured fittings 158 which are received between the ears of clevis brackets 127. A vertically extending pin 159 (FIG. 3) detachably connects the fittings 158 in the brackets 127.

The tie-rods 155 serve to hold the shot cylinder 9 in place on the base 2 during operation, such that the shot cylinder remains slideably supported on the rails 14 and 15 without positively clamping or otherwise anchoring the shot cylinder to the base. The reaction forces to the advancement of the shot cylinder plunger apply tensile stress in the tie-rods 155, and are thereby resisted.

OPERATION

Figure 4:
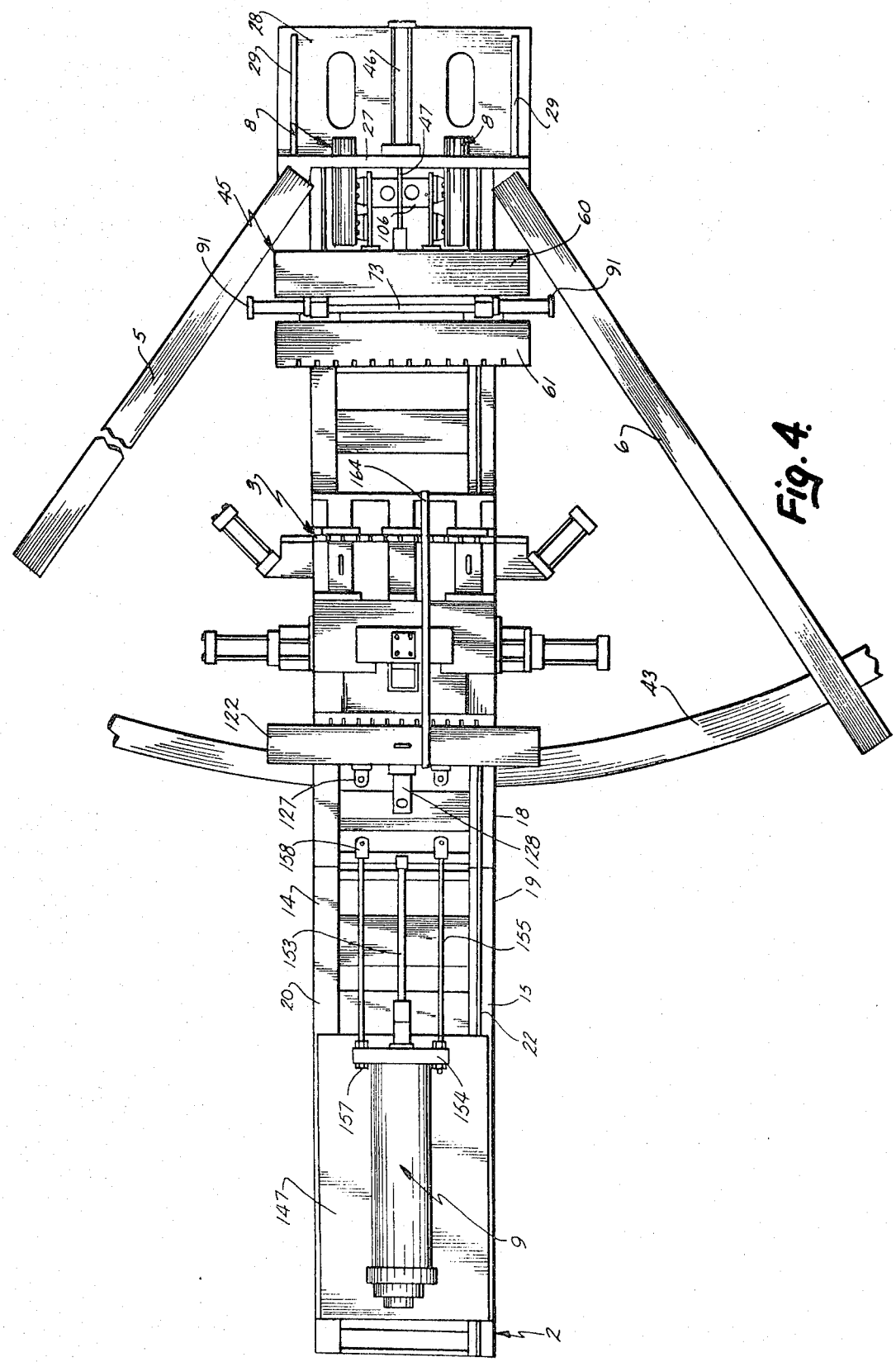
FIG. 4 is a top plan view of the molding machine, shown with the clamping frames in the fanned-apart open position, and the die detached, ready for removal.

In use, a die is mounted on the molding machine 1 in accordance with the following procedure. Shot cylinder 9 is either removed from base 2 or slid forwardly (to the left as viewed in FIG. 1) to a forwardmost end of the base. With the compression columns 8 in the retracted position, ram 46 is retracted so as to translate the carriage 45 to a position wherein the fixed platen 60 is adjacent the point the rearward face 40 of the clamping frames assume in a closed position. In this retracted position, as shown in FIGS. 4 and 5, the rearward ends of the lower two compression columns 8 are received through the apertures 32 in end plate 27, and the upper two compression columns extend over the recessed portion of the end plate upper edge 34. Clamping frames 5 and 6 are laterally pivoted to a fanned apart, open position (FIGS. 1 and 4) sufficient to vertically lower the die 2 onto a central portion of the base 2 without interference or obstruction. Power means (not shown) may be provided to mechanically pivot the clamping frames.

Where size permits, the die 3 is preferably stored with the die halves 120 and 121 fastened together. For these smaller dies, means such as the illustrated banding 164 is suitable. For larger dies, the die halves are typically handled separately. For purposes of description herein, it shall be assumed that both die halves 120 and 122 have the associated slide arrangement 124 and 137 already connected therewith, and that the initial alignment adjustments for mating die halves have already been performed. In the installation of the smaller dies, an overhead cable 165 is connected with the eye-bolts 130 and 142 to securely suspend the entire die from the cable. The die 3 is lowered onto the base 2 of the molding machine, with the alignment channels in the bottom of the sliding supports of each die half positioned over the track rib 22. For large dies, the die halves are individually positioned on the base 2 by means such as an overhead crane. In either case, once the die has been placed onto the base, the die halves 120 and 121 are automatically aligned with each other, as well as aligned with the shot cylinder 9 and the movable carriage 45. The disclosed arrangement not only aligns the die halves 120 and 121 in the longitudinal or horizontal direction, but also positions the die halves vertically. The die 3 is preferably set onto the base of the molding machine at a position wherein the clamping frames 5 and 6 can be pivoted to the fully closed position. If the die position requires adjustment, the entire die may be bodily translated along the rails into a position wherein the clamping frames can be folded.

Figure 18:
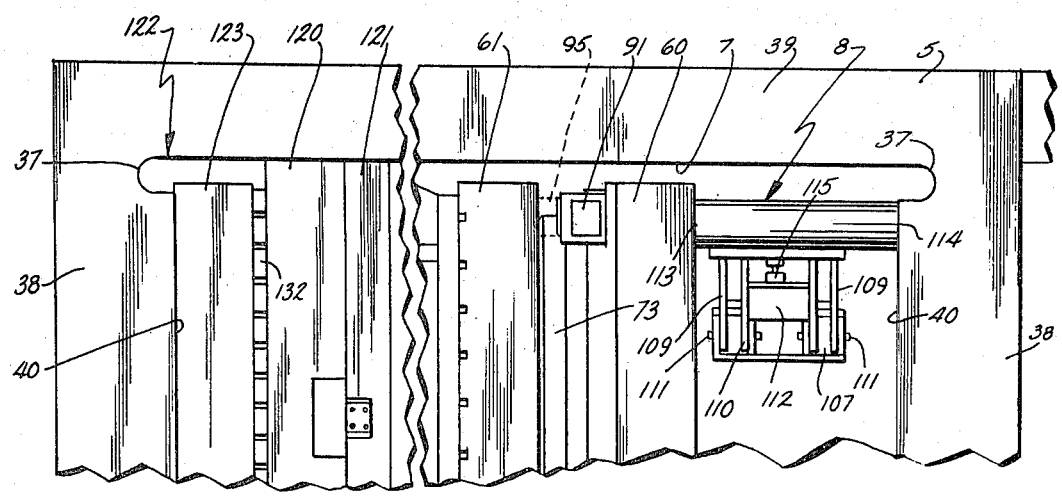
FIG. 18 is an enlarged, fragmentary side elevational view of the molding machine, with the full lines illustrating a fully closed, compressed die position, and the phantom lines illustrating a locked die position.

Carriage or rear platen 45 is then translated forwardly by the extension of ram 46, until movable platen 61 abuts the face plate 141 of movable die half 121. Retaining means, such as bolts 160 (FIG. 18) connect the movable platen with the die face plate 141. Next, the clamping frames 5 and 6 are pivoted inwardly until the inside faces 41 of the clamping frames abut the stops 24. The clamping frames are thereby positively positioned in the closed position, with the frames mutually parallel and disposed adjacent the sides of base 2. Pads 23 support the free ends of the clamping frames, and horizontally retain the frames in a parallel relationship with the rails 14 and 15. In the closed position, as best illustrated in FIG. 16, the vertical side portions 166 of the fixed platen 60 are captured between the rearward frame ends 40 and the upper and lower arms 39 of the clamping frames 5 and 6. The end platen 123 is positioned between the forward frame ends 40 and the upper and lower arms 39 of the clamping frames, such that urging the platens 60 and 123 divergingly apart causes the same to engage the ends 40 of the clamping frames and be retained in place against further divergence by the clamping frames.

Carriage 45 is again translated forwardly by ram 46, with die halves 120 and 121 sliding therewith over rails 14 and 15, until end platen 123 abuts the forward ends 40 of the clamping frames. Platen 123 is then connected with the forward clamping frame ends 40, thereby positively holding the clamping frames in the folded position, and retaining platen 123 substantially stationary with respect to base 2 without clamping or otherwise positively attaching the platen and die with the base 2. In the example illustrated in FIGS. 2 and 15, plates 161 are attached to the opposite sides of end platen 122 and extend forwardly therefrom against the exterior faces 41 of the clamping frames. In this manner, the clamping frames 4 and 5 are retained in the closed position without requiring any holes in the same. For lightweight dies, any banding 164 is then removed from the die. A shot sleeve or cold chamber 128 is selected in accordance with die 3, and connected with platen 123. Shot cylinder 3 is mounted on the frame rails 14 and 15 and slid forwardly thereon until the fittings 158 on the free ends of tie-rods 155 are positioned in clevis brackets 127. Pins 159 are inserted through the aligned apertures and interconnect the tie-rods and the end platen. Shot plunger 153 is then positioned in the forward portion of shot sleeve 128. The preplumbed service lines and electrical pigtails 143-145 on the die half are connected with utility lines disposed adjacent the molding machine. The machine is then dry cycled, as described hereinbelow, to insure that the carriage, die halves, platens, and shot cylinder are all properly located in the alignment track.

Figure 17:
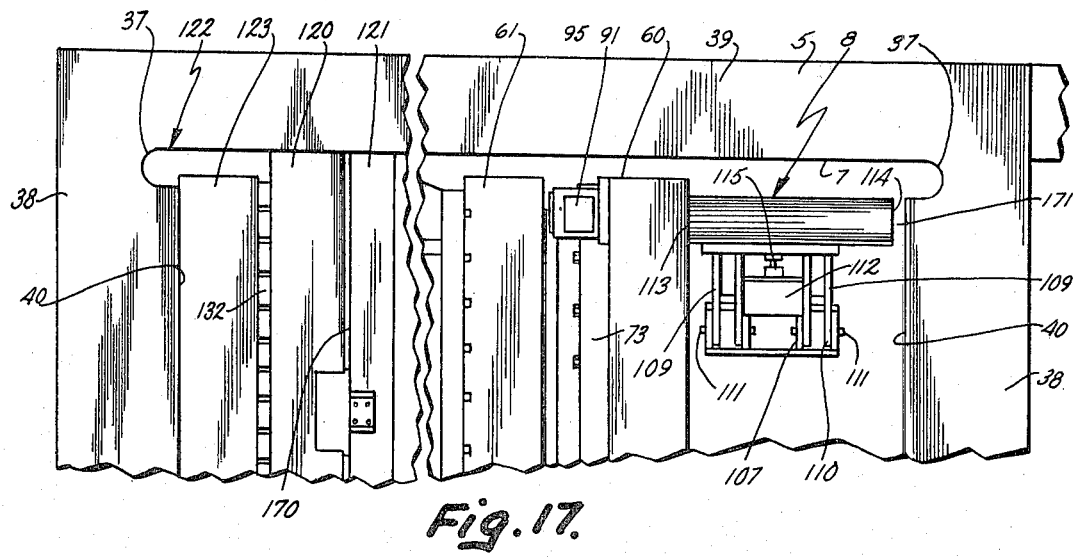
FIG. 17 is an enlarged, fragmentary side elevational view of the molding machine, shown in a partially closed, precompression die position.

In the operation of molding machine 1, the die halves 120 and 121 initially assume the fully retracted position shown in FIGS. 15 and 16. With the movable die cores 140 retracted, a parting agent is applied to both die halves to facilitate ejection of the finished part from the die, and the cores 140 are then inserted. Ram 46 is then extended, thereby longitudinally sliding the movable carriage 45 and movable die half 121 along base rails 14 and 15 to converge the die halves 120 and 121, until such time as the movable die reaches a partially closed, precompression condition, as illustrated in FIG. 17. In this position, there is a gap 170 between the die halves, as well as a space 171 between the rearward end 114 of the compression columns 8, and the rearward surface 40 of the clamping frames. Ram 46 is then deactivated, and the compression columns 8 are rotated outwardly by the extension of cylinders 115 into a position wherein columns 8 are disposed between the fixed platen 60 and the rearward frame ends 40. The compression cylinder 73 is then extended, which diverges the platens 60 and 61, and moves carriage 45 slightly rearwardly, closing space 171, until such time as the rearward ends 114 of the compression columns 8 engage the rearward frame surfaces 40. At this point, further extension of the compression cylinder forces the fixed and movable die halves 120 and 121 securely together to close the gap 170. Substantial compressive forces, such as in the nature of 3000 tons for large engine block dies, are applied to the die halves so as to seal the same securely together and prevent spitting during the injection of the molding material. After the die halves 120 and 121 have been forced together at a preselected pressure, wedges 93 are activated, so that studs 95 are extended outwardly into an abutting relationship with the adjacent surface of movable platen 61, as shown by the phantom lines in FIG. 18, and also in FIG. 12. Compression cylinder 73 may then be de-energized to relieve the pressure thereon, or it may remain activated to assist jacks 91 in retaining the die halves together.

To form a part, liquid molding material, such as molten metal, is placed into the mouth 129 (FIG. 1) of shot sleeve 128 by any suitable means, such as hand or automatic ladling. Shot cylinder 9 is then activated, extending plunger 153, and thereby driving the molten metal through gates in the die into the cavities formed between the die halves 120 and 121. For certain types of dies, such as those having a large surface area and/or a complex shape, extremely high pressures are required to flow the molten metal into the die cavities in a manner which completely fills the same. The pressure applied by the shot cylinder plunger 153 tends to diverge shot cylinder 9 from sleeve 128. The tie-rods 155 resist this motion, thereby placing tensile loading on the same. Since the shot cylinder reaction forces are resisted by the tie-rods, the shot cylinder assembly need not be, and is not positively clamped or otherwise connected to the base rails 14 and 15.

As the molten metal flows into the die cavities the pressure of the same acts on the die surface and tends to part or diverge the die halves 120 and 121. Where the surface area of the die is very large, as is the pressure of the incoming molding metal, the separation forces experienced during die injection are very great. In the present invention, the die halves 120 and 121 are positively locked together in a compressed state between the ends of the clamping frames 5 and 6 by the blocking action of the compression columns 8 and the wedges 93, such that the die separation forces are resisted substantially solely by the clamping frames 5 and 6. The compression cylinder 73 can also be actuated to assist the wedges 93 in retaining the die halves in the closed position. Because of the configuration of the clamping frames, longitudinally directed forces applied to the ends 38 of the frames are resisted substantially solely by pure tensile loading in the upper and lower arms 39. A dwell period is usually provided after injection to permit the formed molten metal to cool and solidify. The combined motion of ram 46 and compression cylinder 73 produce a two stage translation and die compression without the conventional mechanical toggle arrangement.

After injection is completed, compression cylinder 73 is reenergized (if not energized during mold injection) to place force on the movable platen 61 and unlock the blocking. Wedges 93 are retracted, and compression cylinder 73 is then retracted. Ram 46 is extended slightly to move carriage 45 forward to reestablish the space 171 between the rearward ends 114 of compression columns 8 and the frame end surfaces 40. The compression columns 8 are then retracted to the vertical position, such that carriage 45 can be translated rearwardly between the rearward ends 38 of the clamping frames. Ram 46 is then retracted, thereby sliding movable die half 121 and carriage 45 away from stationary die half 120. The carriage 45 is retracted rearwardly to a fully open position, as illustrated in FIGS. 15 and 16, wherein the back, fixed platen 60 is disposed adjacent the end surfaces 40 of the clamping frames. The molded article (not shown) normally sticks in the movable die half 121. The cores 140 in the movable die half 121 are then retracted so the formed article can be ejected from the die. A standard ejector mechanism (not shown) is attached to the back of the die to eject the casting. Conventional means are provided for removal of the molded article from the die area. A plurality of articles are formed by repeating the above described sequence.

During the operation of the molding machine, die halves 120 and 121 heat up due to exposure to the molten metal. Cooling water is flowed through the die to keep the temperature of the same from exceeding a predetermined level. The die halves experience appreciable temperature fluctuation not only during start up, but also during operation as a result of irregular cycling of the cooling water through the die. These temperature fluctuations result in thermal expansion and contraction of the various die parts, which is usually uneven because of the shape of the parts and the different locations at which the heat is applied. The single rib construction of the alignment track 21 permits die halves 120 and 121, carriage 45 and shot cylinder 9 to move laterally on the base 2, so that the parts will not bind on the track rib as they are translated over the rails 14 and 15, or slide plates 62. Further, the clearance provided between the piston 76 and housing 74 of cylinder 73 permits movable platen 61 to cock slightly in response to uneven temperature fluctuations in die half 121. In this manner, the compression forces are evenly applied to the die halves, with the self-compensating alignment action of cylinder 73.

After the desired number of parts are formed with die 3, the die can be removed and replaced with another die to mold a different part. To remove die 3, the service utilities are disconnected from the die, and end platen 123 is disconnected from the forward ends 40 of the clamping frames. Pins 159 are removed from clevis brackets 127, and the shot cylinder is slid to the forwardmost portion of the base rails 14 and 15. The rear face plate 141 of the movable die half 121 is then disconnected from the movable platen 61. For large, heavy dies, the die halves are separately removed from the molding machine, and are therefore left positioned in a spaced apart manner on the base. For lightweight dies, the two die halves 120 and 121 are slid together on the base rails to a closed position. The die halves are then banded together by means such as straps 164, so that they will not separate during removal. For both large and small dies, the clamping frames 5 and 6 are then pivoted laterally outwardly to the fanned apart position, wherein the inside surfaces 41 of the clamping frames are free from the outermost portions of the die. The eye-bolts 130 and 142 on the die are connected with cable 165, and the die halves are bodily raised upwardly off of the base, and transported to a remote storage location. Another die is then installed in the molding machine in the manner previously described.

The pivoting clamping frames 5 and 6 in conjunction with the sliding connection of die 3 on base rails 14 and 15 provide a design wherein even very large dies can be quickly and easily removed and replaced, thereby reducing expensive machine down time. Further, since the service utilities are connected in a modular fashion, the time required to connect and disconnect these services is greatly reduced. The blocking elements of the molding machine provide an arrangement wherein not only is the die easily removed and replaced, but during operation, the die halves are securely and positively retained in a compressed condition during die injection to prevent spitting even under high injection pressures. The sliding support system for the die halves in conjunction with the alignment track on the base rails reduces time consuming alignment procedures, and retains the die halves in accurate alignment during operation without constant adjustment. Since none of the major machine parts are positively connected with the base during operation, uneven thermal expansion and the intermittent forces of die injection do not result in loose connections which cause misalignment between the members of the machine as is experienced in prior devices. The compression cylinder 73 provides lateral self-adjustment to insure that the compression forces applied to the die halves are evenly distributed. Because neither the die 3, the shot cylinder 9, nor the movable carriage 45 are fixedly attached to the base of the machine, the device can be easily disassembled for shipment, and reassembled without extensive adjustment.

In the foregoing description, it will be readily appreciated by those skilled in the art that various modifications may be made to the invention without departing from the spirit or scope of the invention as defined by the appended claims.

The embodiments of the invention in which an exclusive property or privilege is claimed are defined as follows.

1. A molding machine, comprising:
 a base adapted to support thereon a two-part die having mating halves;
 first and second platens slideably mounted on said base, and adapted for operable connection with said die;
 a ram coupling said platens and for diverging and converging the same between releasing and molding positions; and
 means for releasably locking said platens and said die in a closed position during molding, and an open position for releasing a part, comprising a pair of clamping frames connected with opposite sides of said base, and including means defining a closed border sized to receive said platens therein.

2. A molding machine as set forth in claim 1, wherein said locking means further comprises:
 means extending between an end leg of said clamping frames and an adjacent one of the platens for positively blocking the platens together in the closed position within said clamping frames, whereby die separation forces are resisted substantially solely by said clamping frames.

3. A molding machine as set forth in claim 2, wherein:
 said clamping frames are pivotally connected with said base, and are manipulated between a fanned-apart position and a folded position for die removal and molding operation respectively.

4. A die casting machine, comprising:
 a base for receiving a pair of plates for movement between a closed position in which a die when positioned therebetween is closed, and an open position in which an article formed in the die can be removed therefrom;
 means coupled to said base for moving at least one of said plates between said open and closed positions; and
 frame means movable with respect to said base between an open frame position wherein the die can be freely removed from said base, and a closed frame position wherein said frame means surrounds the die and said plates during casting, said frame means comprising first and second rigid clamping frames mounted on opposite sides of said base, and including means defining a closed border sized to receive said die therein in the closed frame position.

5. A die casting machine as set forth in claim 4, including:
 means extendable between an end leg of said clamping frames and the die for positively blocking said plates in the closed position during die injection.

6. A molding machine, comprising:
 a base for movably supporting thereon a two-part die having mating halves which converge and diverge along said base;
 means for translating the die halves between an open position and a closed position;
 a rigid clamping frame mounted for translation with respect to said base, and including means defining a closed border sized to receive the die halves therein;
 means for translating said clamping frame between an open position wherein the die can be freely removed from said base, and a closed position wherein the closed border of said clamping frame is received over and surrounds side portions of the die;
 means extendable between an end leg of said clamping frame and the die for positively blocking the die halves in the closed position within said clamping frame, whereby die separation forces developed during die injection are resisted by said clamping frame.

7. In a molding machine, the improvement comprising:
 an elongate base having an upper support surface;
 first and second rails mounted on the upper support surface of said base in a laterally spaced apart, mutually parallel relationship;
 a two-part die, comprising first and second die halves, each of said die halves including support pads on opposite sides thereof which mate with said rails, and slideably support said die halves for longitudinal translation along said rails; said support pads being shaped to position said die halves in precise vertical alignment on said rails to insure accurate mating therebetween;
 an alignment track extending along the length of said base, and comprising a way and a mating guide disposed in one of said rails and an associated one of said support pads, thereby insuring horizontal alignment between said die halves; the other of said rails and associated support pads being free from obstruction to permit lateral movement therebetween to avoid binding between said rails and said support pads during temperature fluxuation.

8. A molding machine as set forth in claim 7, including:
 a shot cylinder slideably mounted on the upper support surface of said base, including alignment means mating with said alignment track, and being adapted for detachable connection with a cover half of said die.

9. A molding machine as set forth in claim 8, including:
 a compression ram extending between said platens.

10. A molding machine as set forth in claim 9, including:
 first and second clamping frames, each having one end thereof pivotally mounted on opposite sides of said base at a first end thereof, and including means defining a closed border sized to receive said die and said movable platens therein; and
 means for pivoting said clamping frames between a fanned-apart position wherein the free ends of said clamping frames are spaced outwardly from the sides of said base a distance sufficient to permit the die to be freely lifted off of said base, and a folded position wherein the free ends of said clamping frames are converged adjacent to the sides of said base and said clamping frames are received over and surround side portions of said die and said platens.

11. A molding machine as set forth in claim 10, including:
 means extending between the ends of said clamping frames and the nearest one of said die members, and positively blocking said die members in the closed position between the ends of said clamping frames, whereby die separation forces developed during die injection are resisted substantially solely by said clamping frames.

12. A molding machine as set forth in claim 11, wherein:

said alignment track includes a rib extending longitudinally along the support surface of one of said rails, and a mating groove disposed in the associated die support pads.

13. In a molding machine, the improvement comprising:

a base having an upper support surface;

a two-part die supported on the upper surface of said base, and including a cover half in which a cold chamber is mounted;

a shot cylinder abuttingly and slideably supported on the upper surface of said base for longitudinal movement therealong, and including a plunger;

first and second ties having first ends connected with said shot cylinder at opposite sides of said plunger; said ties having second ends connected with the cover half of said die at opposite sides of said cold chamber; said ties being substantially longitudinally inelastic, whereby reaction forces developed during die injection between said shot cylinder and said die are resisted substantially solely by said ties, such that said shot cylinder need not be fixedly anchored to said base, and can self-adjust longitudinally thereon.

14. A molding machine as set forth in claim 13, including:

first and second rails mounted on the upper support surface of said base, at at least one end of said base, in a laterally spaced apart, mutually parallel relationship; and support pads mounted on opposite sides of said shot cylinder, and mating with said rals to slideably support said shot cylinder on said rails for longitudinal translation therealong.

15. A molding machine as set forth in claim 14, wherein:

said support pads are shaped to vertically align said shot cylinder plunger with said cold chamber.

16. A molding machine as set forth in claim 15, including:

an alignment track extending along one side of said base, and comprising a way and a mating guide disposed in one of said rails and an associated one of said support pads, thereby insuring alignment between said shot cylinder and said die; the other of said rails and associated support pads being free from obstruction to permit lateral movement therebetween to avoid binding between said rails and said support pads during temperature fluxuations.

* * * * *